UNITED STATES PATENT OFFICE.

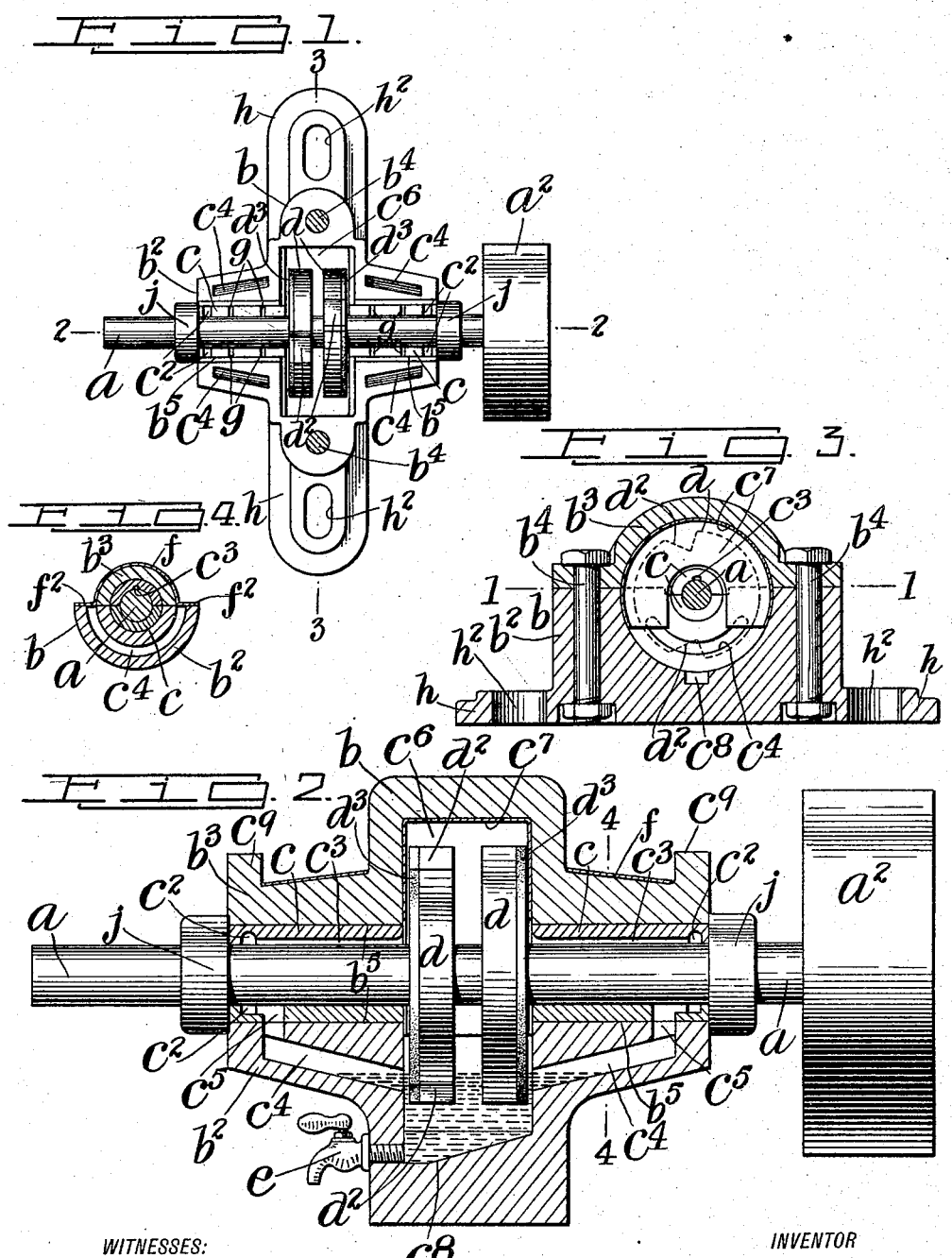

RICHARD PROHL, JR., OF JERSEY CITY, NEW JERSEY.

SELF-OILER SHAFT-BEARING.

1,188,484.

Specification of Letters Patent.

Patented June 27, 1916.

Application filed March 3, 1915. Serial No. 11,757.

*To all whom it may concern:*

Be it known that I, RICHARD PROHL, Jr., a citizen of the United States, and residing at Jersey City, in the county of Hudson and State of New Jersey, have invented certain new and useful Improvements in Self-Oiler Shaft-Bearings, of which the following is a specification, such as will enable those skilled in the art to which it appertains to make and use the same.

This invention relates to means for oiling or lubricating shaft bearings, and the object thereof is to provide an automatic device of this class, whereby the bearings of a shaft of almost any kind or class may be automatically lubricated at all times; and with this and other objects in view the invention consists in a device of the class specified, constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a horizontal sectional view of my improved shaft bearing on the line 1—1 of Fig. 3; Fig. 2 a vertical, longitudinal sectional view of the complete bearing and on the line 2—2 of Fig. 1; Fig. 3 a similar transverse sectional view on the line 3—3 of Fig. 1; and, Fig. 4 a section on the line 4—4 of Fig. 2.

In the drawing forming part of this specification, I have shown at $a$ a horizontal power shaft of any kind or class and provided at one end with a drive wheel or pulley $a^2$, and at $b$ I have shown my improved self oiler shaft bearing which consists of a base part $b^2$ and top part $b^3$ connected by bolts $b^4$, and the parts of which are of the following construction.

The complete bearing is elongated longitudinally, as clearly shown in Figs. 1 and 2, and the opposite end portions thereof are preferably, in the form of truncated cones, and the bore or passage $b^5$ in the bearing and through which the shaft passes is formed partly in the bottom and partly in the top part of the bearing and is provided in said top and bottom parts with semi-sleeve bushings $c$, and the bushings $c$ in the top part are provided at their outer ends with annular grooves $c^2$ and with top central longitudinal grooves $c^3$ which communicate therewith, and in the end portions of the bottom part of the bearing are semi-annular recesses or chambers $c^4$ which are semi-conical in form and which communicate with the grooves $c^2$ at $c^5$.

Within the central part of the bearing and formed both in the top and bottom portions thereof, is a transverse chamber $c^6$ through which the shaft $a$ passes, and said shaft is provided within said chamber with two disk or wheel members $d$ which are secured thereto, and the disk or wheel members $d$ are provided in their faces with recesses $d^2$, and on their outer sides with fibrous facings $d^3$, and that part of the chamber $c^6$ in the top part of the bearing is provided with a lining $c^7$, preferably of metal, and the side portions of which extend down into the bottom part of the bearing. In the bottom of the chamber $c^6$ is a groove $c^8$, and the bottom part of the bearing is provided with a faucet $e$ which communicates therewith, and by means of which the contents of the chamber $c^6$ may be drawn off, when desired.

The semi-annular recesses or chambers $c^4$ in the bottom part of the bearing open through the top thereof, as shown in Fig. 1, and the end portions of the top part of the bearing are of less transverse dimensions than the end portions of the bottom part and are provided with raised flanges $c^9$, and when the separate parts of the bearing are connected, the recesses or chambers $c^4$ in the bottom part and which open through the top of the bottom part, as shown in Fig. 1, are exposed as shown in Fig. 4, and metal caps $f$ are placed on the end portions of the top part and provided with flanges $f^2$ which cover or close the recesses or chambers $c^4$.

The bushings $c$ in the bottom part of the bearing are preferably provided in the top thereof with transverse recesses $g$, any desired number of which may be employed, and which serve as supplemental oil containers or lubricators, and in the use of my improved bearing the caps $f$ are removed and lubricating material is poured into the recesses or chambers $c^4$, and flows into the bottom of the chamber $c^6$, and the wheels $d$ which rotate with the shaft $a$ in said chamber and particularly the fibrous facings $d^3$ thereof take up the oil or other lubricating material and carry it into the top portion of the chamber $c^6$ and distribute it over the side walls of said chamber and onto the shaft $a$, and the said lubricating material flows longitudinally along said shaft through the groove $c^3$ and around said shaft through the groove $c^2$ and back into the bottom of the chambers or recesses $c^4$ from which said material flows back into the bottom of the chamber $c^6$, and in this way the shaft $a$ is thoroughly lubricated at all times.

My invention is not limited to the exact details of construction herein shown and described, including the caps $f$ for closing the chambers or recesses $c^4$, and various changes in and modifications of these features of the construction as well as other parts of the complete bearing, as herein shown and described, may be made, within the scope of the appended claims, without departing from the spirit of my invention or sacrificing its advantages.

The bottom part of the bearing is provided with flanges $h$ having apertures $h^2$, whereby said bearing may be secured to any suitable support and the shaft $a$ is provided at the opposite ends of the bearing, in the construction shown, with collars $j$, but my invention is not limited to any particular means for supporting the bearing and the collars $j$ may or may not be employed.

Having fully described my invention, what I claim as new and desire to secure by Letters Patent, is:—

1. A shaft bearing composed of separate top and bottom parts, the end portions of the bottom part being wider than the corresponding ends of the top part, said parts being provided with a central transverse chamber and the end portions thereof with central longitudinal bores through which the shaft passes, said shaft being provided within said chamber with rotary members having fibrous facings on their outer sides and the bores of said bearing being provided with bushings having lubricating passages which communicate with said chamber centrally thereof and also with the bottom portion thereof and the ends of said bottom part being provided with arc-shaped ports or passages which open upwardly and outwardly and which also communicate with said transverse chamber, said arc-shaped ports or passages serving as means for supplying a lubricator to said chamber.

2. A shaft bearing composed of separate top and bottom parts, the end portions of the bottom part being wider than the corresponding ends of the top part, said parts being provided with a central transverse chamber and the end portions thereof with central longitudinal bores through which the shaft passes, said shaft being provided within said chamber with rotary members having fibrous facings on their outer sides and the bores of said bearing being provided with bushings having lubricating passages which communicate with said chamber centrally thereof and also with the bottom portion thereof, the ends of said bottom part being provided with arc-shaped ports or passages which open upwardly and outwardly and which also communicate with said transverse chamber, said arc-shaped ports or passages serving as means for supplying a lubricator to said chamber, and the ends of the top part being provided with caps having base flanges which are adapted to close the openings of said arc-shaped ports or passages.

3. A shaft bearing composed of separate top and bottom parts, the end portions of the bottom part being wider than the corresponding ends of the top part, said parts being provided with a central transverse chamber and the end portions thereof with central longitudinal bores through which the shaft passes, said shaft being provided within said chamber with rotary members, having fibrous facings on their outer sides and the bores of said bearing being provided with bushings having lubricating passages which communicate with said chamber centrally thereof and also with the bottom portion thereof, the ends of said bottom part being provided with arc-shaped ports or passages which open upwardly and outwardly and which also communicate with said transverse chamber, said arc-shaped ports or passages serving as means for supplying a lubricator to said chamber, and the top portion of said chamber being provided with a sheet metal hood adapted to inclose said rotary members.

4. A shaft bearing composed of separate top and bottom parts, the end portions of the bottom part being wider than the corresponding ends of the top part, said parts being provided with a central transverse chamber and the end portions thereof with central longitudinal bores through which the shaft passes, said shaft being provided within said chamber with rotary members having a plurality of recesses in their faces and provided with fibrous facings on their outer sides and the bores of said bearing being provided with bushings having lubricating passages which communicate with said chamber centrally thereof and also with the bottom portion thereof and the ends of said bottom part being provided with arc-shaped ports or passages which open upwardly and outwardly and which also communicate with said transverse chamber, said arc-shaped ports or passages serving as means for supplying a lubricator to said chamber.

In testimony that I claim the foregoing as my invention I have signed my name in presence of the subscribing witnesses this 2nd day of March 1915.

RICHARD PROHL, JR.

Witnesses:
C. MULREANY,
H. E. THOMPSON.

Copies of this patent may be obtained for five cents each, by addressing the "Commissioner of Patents Washington, D. C."